UNITED STATES PATENT OFFICE.

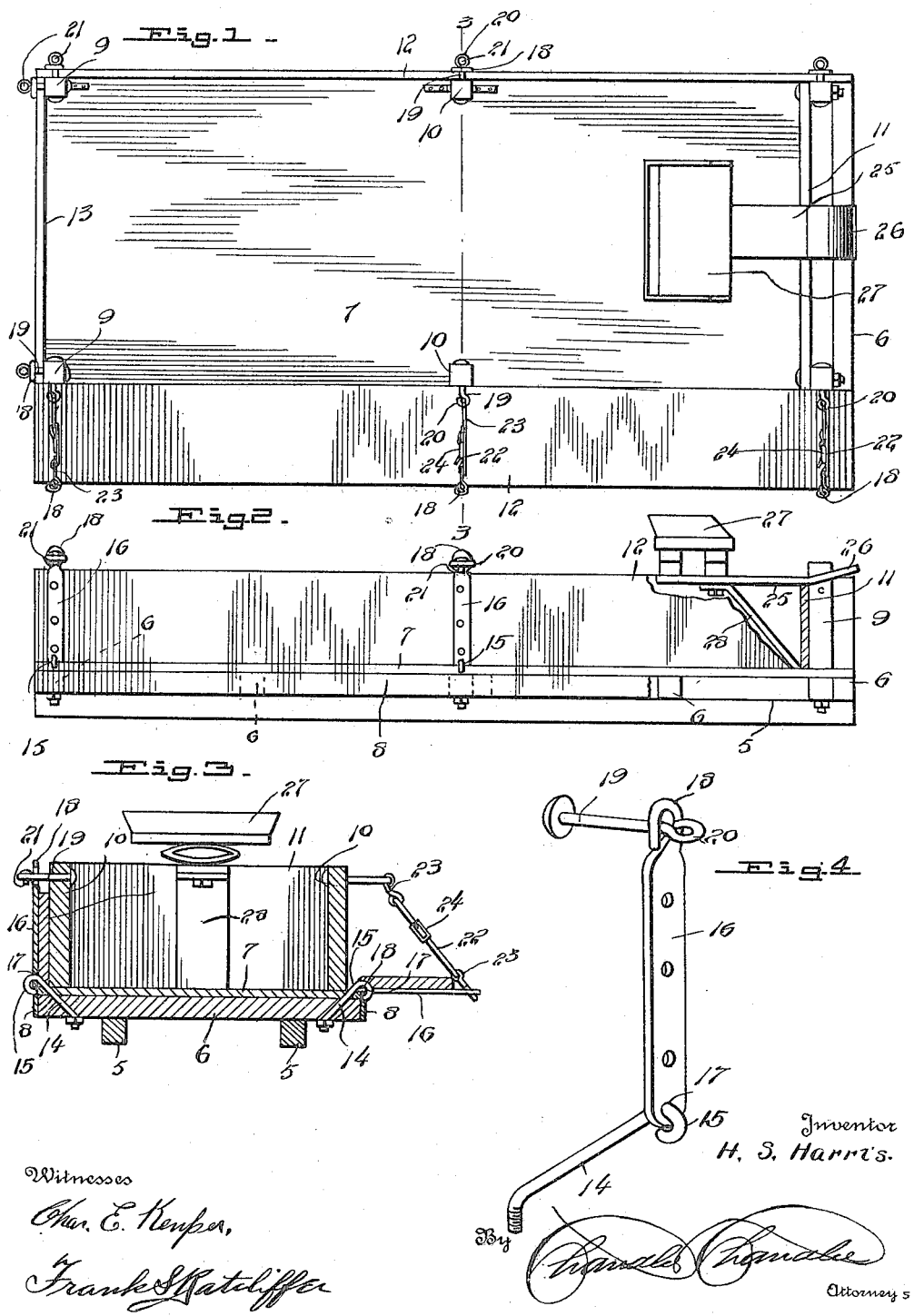

HENRY S. HARRIS, OF CARDWELL, MONTANA.

WAGON-BOX.

1,213,868. Specification of Letters Patent. Patented Jan. 30, 1917.

Application filed January 9, 1914. Serial No. 811,216.

*To all whom it may concern:*

Be it known that I, HENRY S. HARRIS, a citizen of the United States, residing at Cardwell, in the county of Jefferson, State of Montana, have invented certain new and useful Improvements in Wagon-Boxes; and I do hereby declare the following to be a full, clear, and exact description of the invention, such as will enable others skilled in the art to which it appertains to make and use the same.

This invention relates to new and useful improvements in wagons and is directed particularly to wagon bodies.

The object of the present invention resides in the provision of a wagon body having side and end wall members pivotally secured thereto and provided with means whereby they may be held in vertical position to form a wagon box and whereby they may be held in any desired inclined position or in a horizontal position to form a substantially flat wagon body.

A further object of the invention resides in the provision of a wagon body of the class described which comprises a minimum number of parts arranged to form a durable and efficient structure which may be manufactured at a comparatively low cost.

With these and other objects in view, the invention resides in the novel combination, formation and arrangement of parts to be more fully hereinafter described and illustrated in the accompanying drawings and particularly pointed out in the claim hereto appended.

Reference is had to the accompanying drawings wherein similar characters of reference designate corresponding parts throughout the several views and in which:

Figure 1 is a top plan view of the wagon body, with one of the sides thereof in lowered position, Fig. 2 is a side elevation of the wagon body with the side in a raised position, Fig. 3 is a cross sectional view taken on the line 3—3 of Fig. 1, and Fig. 4 is a perspective view of one of the side holding bars and its connections to the major portion of the wagon body.

Referring now more particularly to the accompanying drawings, the bed of the wagon body is shown as comprising the usual pair of spaced longitudinal sills 5 on which are secured a plurality of cross pieces 6 carrying the bottom 7 of the wagon body. Strips 8 are secured to the ends of the cross pieces to give an ornamental appearance to the wagon body.

Standards 9 are disposed at the corners of the bed and inwardly of the edges thereof, similar standards 10 being disposed at the intermediate portions of the sides of the bed. Fixed to the forward standards 8 is the front wall 11 of the wagon body. For pivotally securing the side walls 12 and rear wall 13 to the wagon bed, bolts 14 extend diagonally upward through the end portion and through the edge portions of the bottom 7 and terminate in eyes 15 at the edges of the wagon body and outwardly of the posts 9 and 10. To the outer faces of the side and rear walls are bolted transverse bars 16 each of which is formed at its lower end with an eye 17 engaging with the eye 15 of the adjacent bolt 14. Thus the side and end walls are pivotally secured to the wagon bed.

To provide means for holding the side and rear walls in a vertical position, the bars 16 are extended past the sides of the walls and terminate in eyes 18 and bolts 19 are passed through the upper portions of the uprights 9 and 10 and terminate at their outer ends in eyes 20 adapted to be passed through the eyes 18 and held in this position by cotter members 21 passed therethrough. Thus the side and end walls 12 and 13 respectively may be held in an upright position with the inner faces engaging against the uprights 9 and 10.

For holding the walls at an inclined or in a horizontal position, straps 22 are provided which carry at each end snap hooks 23 adapted to engage with the eyes 18 and 20; each of the straps is in the form of a loop, with its ends connected by the buckle 24 and the strap is thus extensible to hold the wall at any desired angle.

From the foregoing it is observed that a very simple and efficient device has been provided which will perform all of the functions normally required thereof.

The seat for the wagon comprises a horizontally extending bar 25 disposed on the front wall 11 of the wagon body and extending outwardly thereof with its end portion directed upwardly at 26 to form a foot-piece. The other end portion of the bar extends inwardly of the wagon and carries a spring seat 27, a suitable brace bar 28 being provided for this end portion.

What is claimed is:

A wagon box including a bottom, vertical stakes mounted adjacent the sides of the bottom, side members hinged to the bottom, a metallic plate secured to the outer face of each of the side members and opposite each of the stakes, an eye bolt disposed through the upper end of each of the stakes, the outer end of each of the plates extending beyond the outer edge of the side and provided with an eye for the reception of the eye bolt when the side is in vertical position, and for the reception of one end of a flexible connection at times, said flexible element being carried by the eye bolt and including a turn buckle arranged to lengthen or shorten said element whereby to alter the position of the respective side member.

In testimony whereof, I affix my signature, in the presence of two witnesses.

HENRY S. HARRIS.

Witnesses:
IKE. E. O. PAGE,
WM. P. GREEN.

Copies of this patent may be obtained for five cents each, by addressing the "Commissioner of Patents, Washington, D. C."